(12) United States Patent
Oen et al.

(10) Patent No.: US 7,281,862 B2
(45) Date of Patent: Oct. 16, 2007

(54) OPTICAL DEVICE LATCHING MECHANISM

(75) Inventors: Joshua T. Oen, Fremont, CA (US); Daehwan D. Kim, Sunnyvale, CA (US); Ching-Ling Meng, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 11/095,676

(22) Filed: Mar. 31, 2005

(65) Prior Publication Data

US 2006/0222301 A1 Oct. 5, 2006

(51) Int. Cl.
*G02B 6/36* (2006.01)
(52) U.S. Cl. .......................... 385/88; 385/89; 385/90; 385/91; 385/92
(58) Field of Classification Search .................. 385/88, 385/90–92; 439/372, 577, 352
See application file for complete search history.

(56) References Cited

U.S. PATENT DOCUMENTS

| | | | |
|---|---|---|---|
| 6,935,882 B2 * | 8/2005 | Hanley et al. ............... | 439/372 |
| 7,090,523 B2 * | 8/2006 | Shirk et al. .................. | 439/352 |
| 2002/0136501 A1 | 9/2002 | Yen et al. | |
| 2003/0236019 A1 | 12/2003 | Hanley et al. | |
| 2004/0101257 A1 | 5/2004 | Kruger et al. | |
| 2005/0100292 A1 | 5/2005 | Malagrino, Jr. | |

FOREIGN PATENT DOCUMENTS

WO PCT/US2006/012464 8/2006

OTHER PUBLICATIONS

"X2 MSA Rev 1.0b: A Cooperation Agreement for a Small Versatile 10 Gigabit Transceiver Package," pp. 1-28 (Feb. 28, 2003).

* cited by examiner

*Primary Examiner*—Brian Healy
*Assistant Examiner*—Guy G Anderson
(74) *Attorney, Agent, or Firm*—Blakely, Sokoloff, Taylor & Zafman LLP

(57) ABSTRACT

An apparatus including a heat sink compatible with a rail, the heat sink including two engagement windows that align with a corresponding pair of rail engagement windows when the apparatus is positioned in the rail. A handle engaged with the heat sink, the handle to enable a retention position and a retraction position of the apparatus. A first latch and a second latch laterally opposed and positioned within a first cavity and a second cavity, respectively, of the heat sink. A first spring and a second spring laterally opposed and positioned within the first and second cavities, respectively, of the heat sink, the first and second springs engaged with the handle and the first and second latches, wherein the first and second springs to push a first latch end of each latch into the rail engagement window when the apparatus is in a retention position, wherein the first and second springs to actuate the retraction of the first latch end of each latch when the handle is used to place the apparatus in a retraction position.

20 Claims, 13 Drawing Sheets

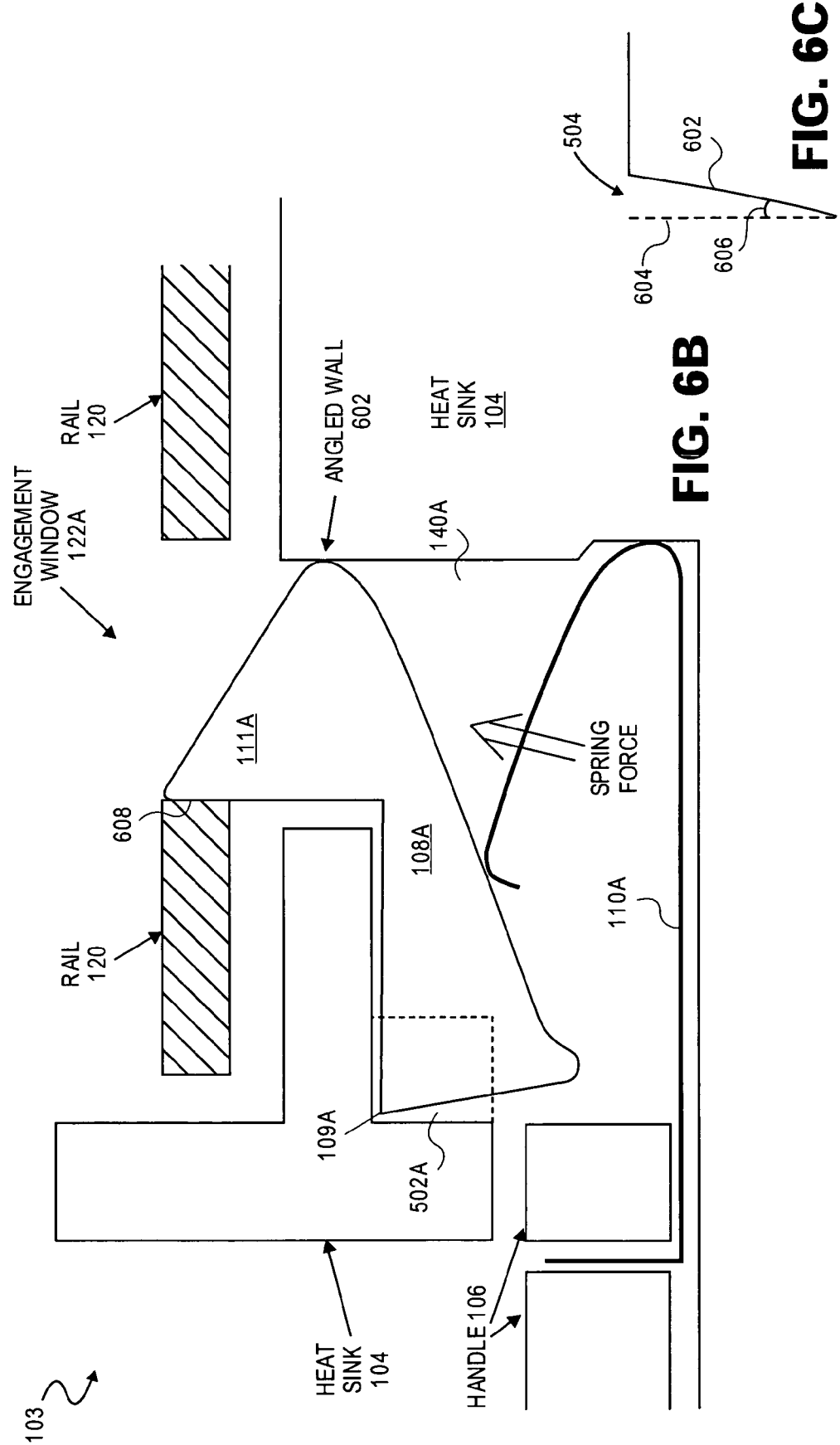

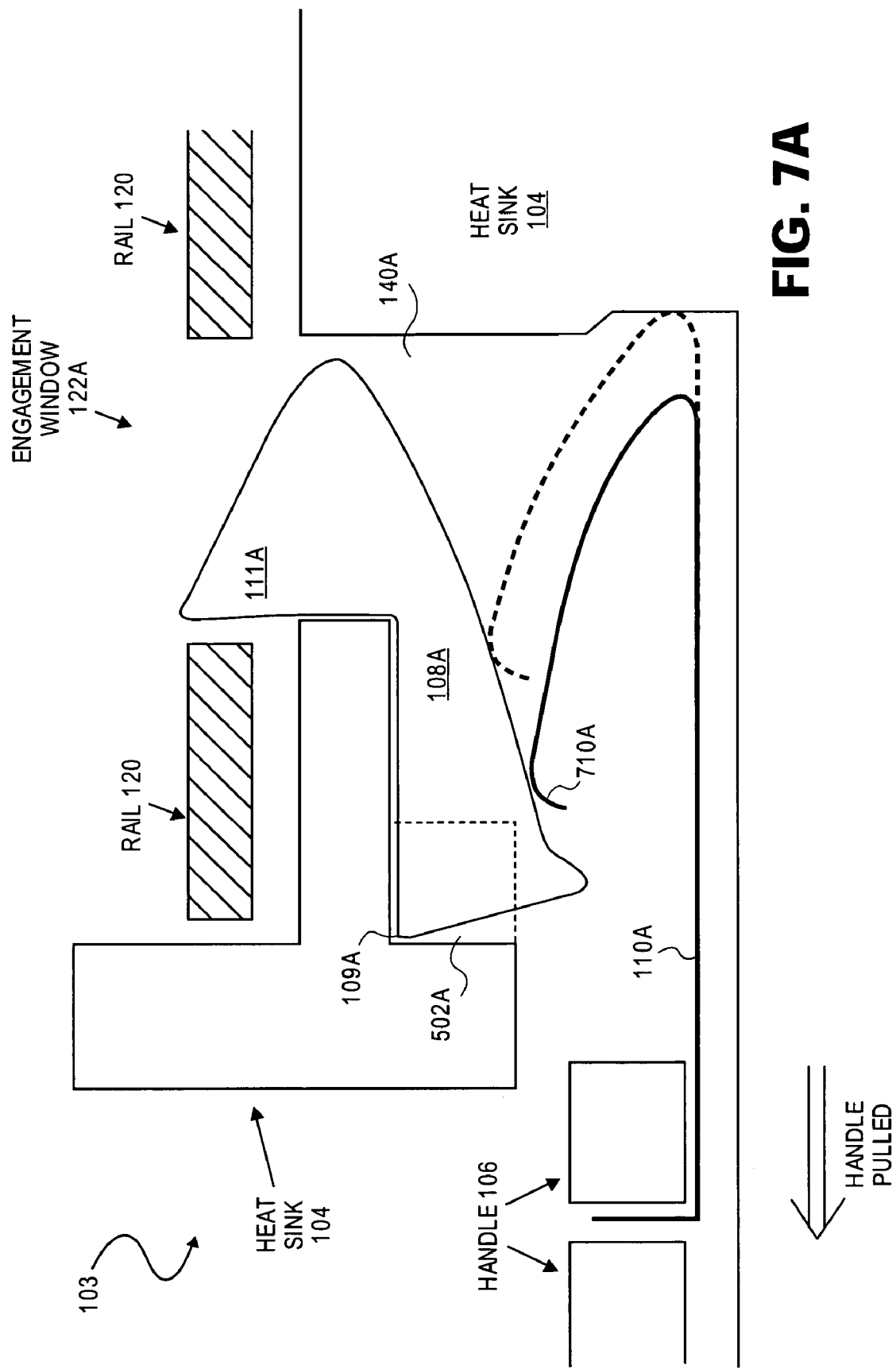

7,281,862 B2

OPTICAL DEVICE LATCHING MECHANISM

BACKGROUND

1. Field

Embodiments of the invention relate to the field of latching mechanisms and more specifically, but not exclusively, to an optical device latching mechanism.

2. Background Information

Optical networks are used in telecommunication and enterprise networks to move data and communications. Optical signals provide high-speed, superior signal quality, and minimal interference from outside electromagnetic energy. Optical networks utilizing Dense Wavelength Division Multiplexed (DWDM) systems offer tunable multi-channel optical links. Such optical links may operate at line rates up to 10 Gigabits per second (Gb/s).

Optical networks may use switches to pass signals between optical networks and servers, host systems, and communication devices. A switch may include several optical devices, such as transceivers, to convert between optical signals and electrical signals. In today's switches, optical devices are often mounted in racks using screws or fasteners.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6B is a block diagram of a latching mechanism in accordance with one embodiment of the present invention.

FIG. 6C is a block diagram of an angled wall of a heat sink holding a latching mechanism in accordance with one embodiment of the present invention.

FIG. 7A is a block diagram of a latching mechanism in accordance with one embodiment of the present invention.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention are in compliance with the "X2 MSA (Multi-Source Agreement): A Cooperation Agreement for a Small Versatile 10 Gigabit Transceiver Package," Feb. 28, 2003, revision 1.0 b (referred to hereafter as the "X2 MSA"). However, it will be understood that embodiments of the invention are not limited to use in X2-compliant transceivers, but may be used in various optical devices.

Figure 1:
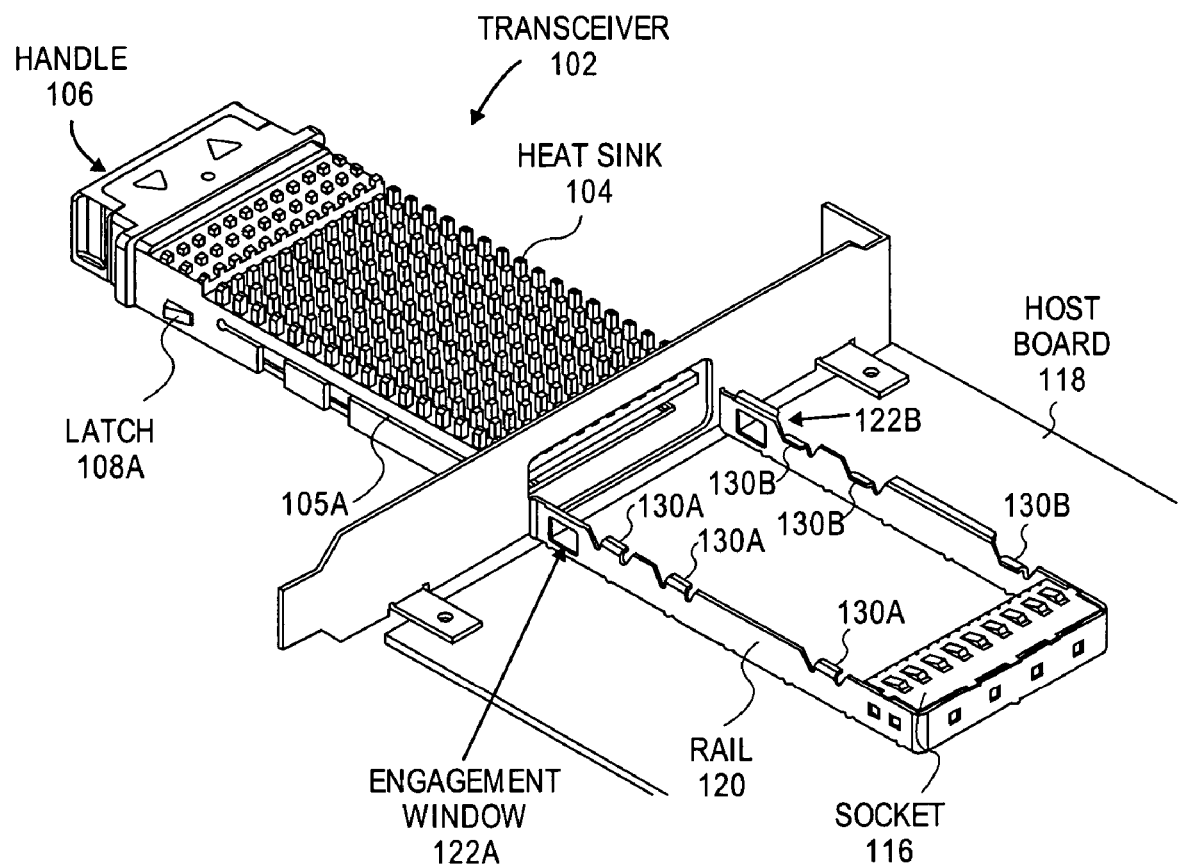
FIG. 1 is a perspective view of a latching mechanism in accordance with one embodiment of the present invention.
Figure 2A:
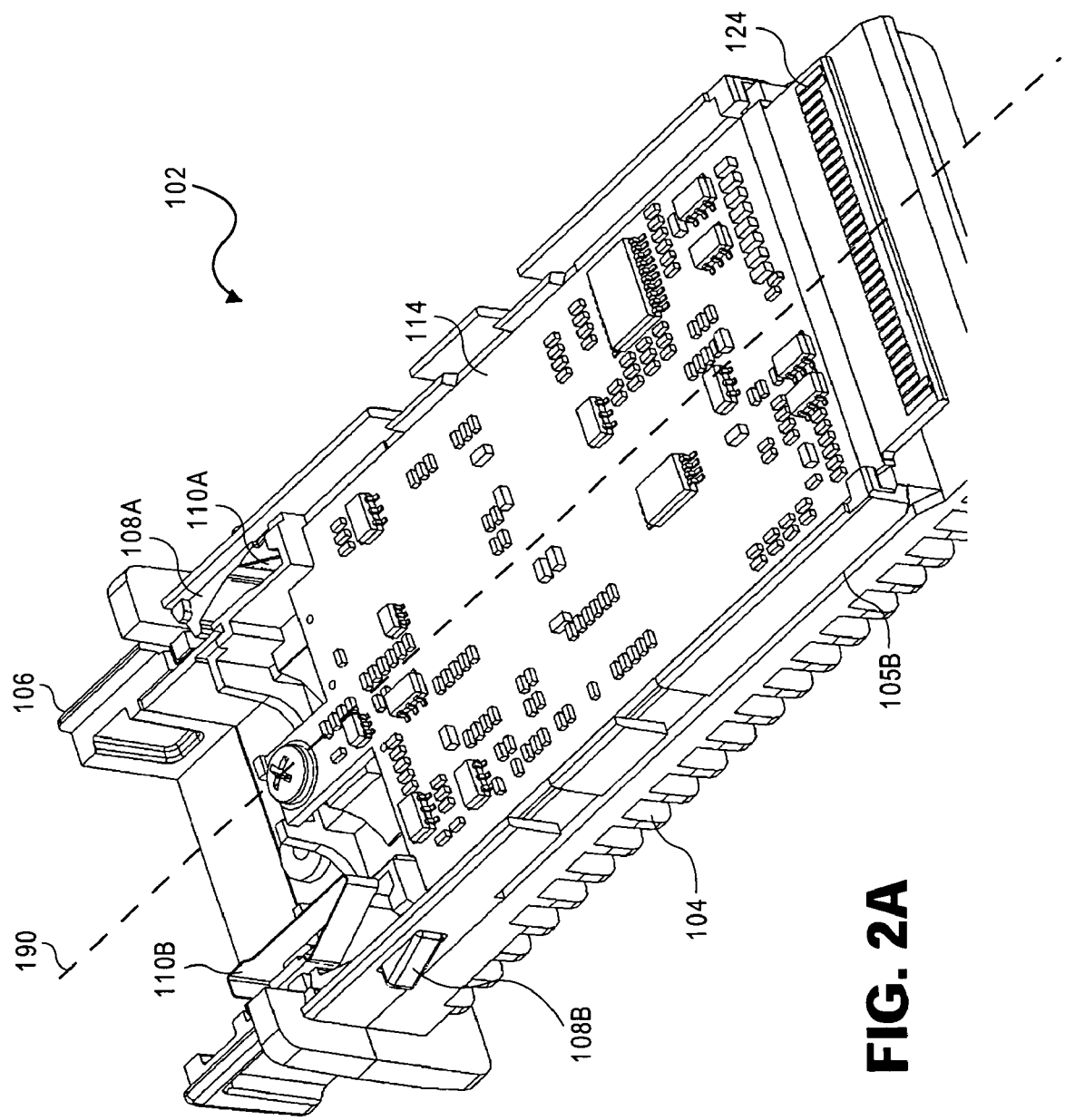
FIG. 2A is a perspective view of a latching mechanism in accordance with one embodiment of the present invention.
Figure 2B:
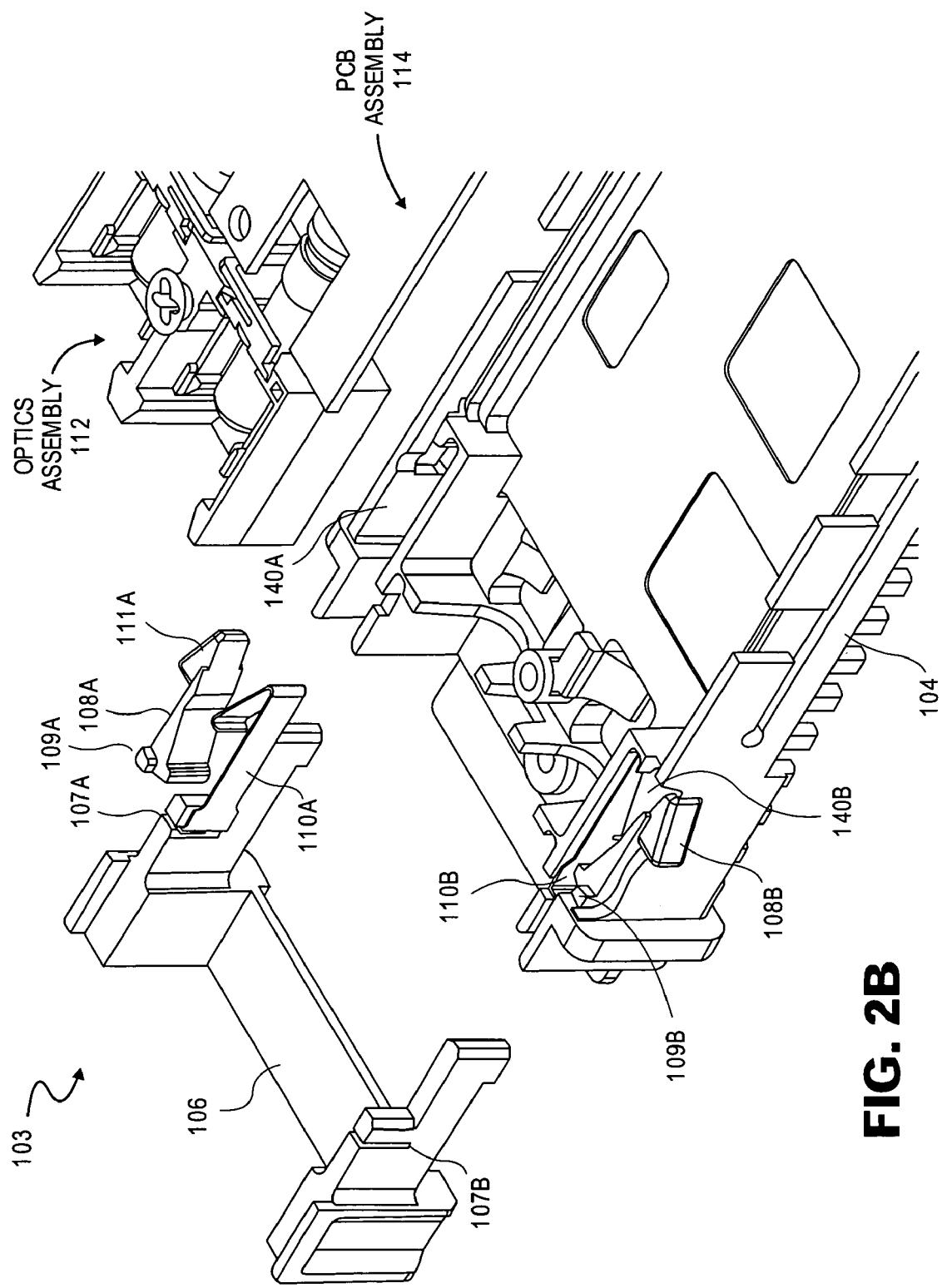
FIG. 2B is an exploded view of a latching mechanism in accordance with one embodiment of the present invention.
Figure 3:
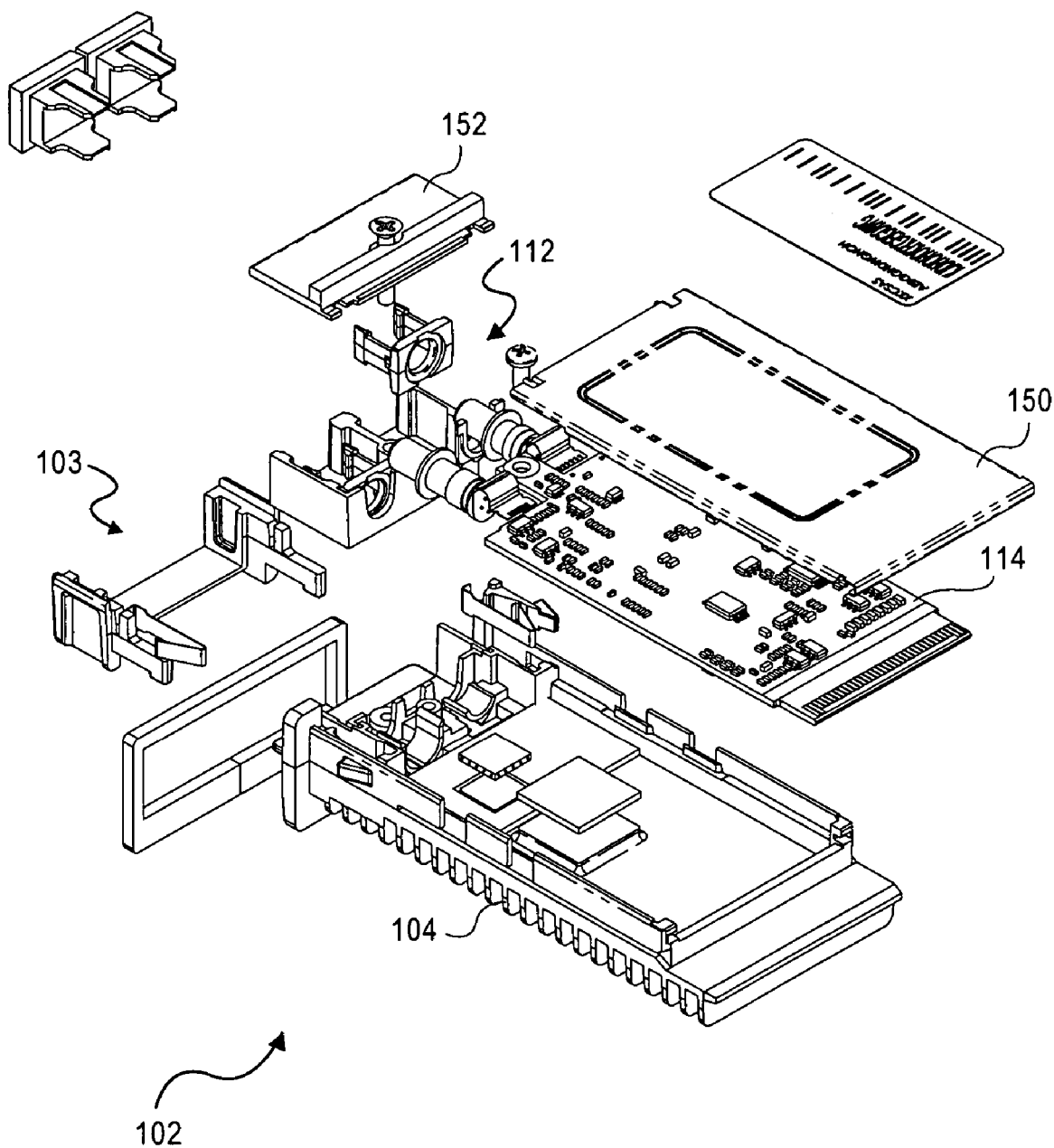
FIG. 3 is an exploded view of a latching mechanism in accordance with one embodiment of the present invention.
Figure 4A:
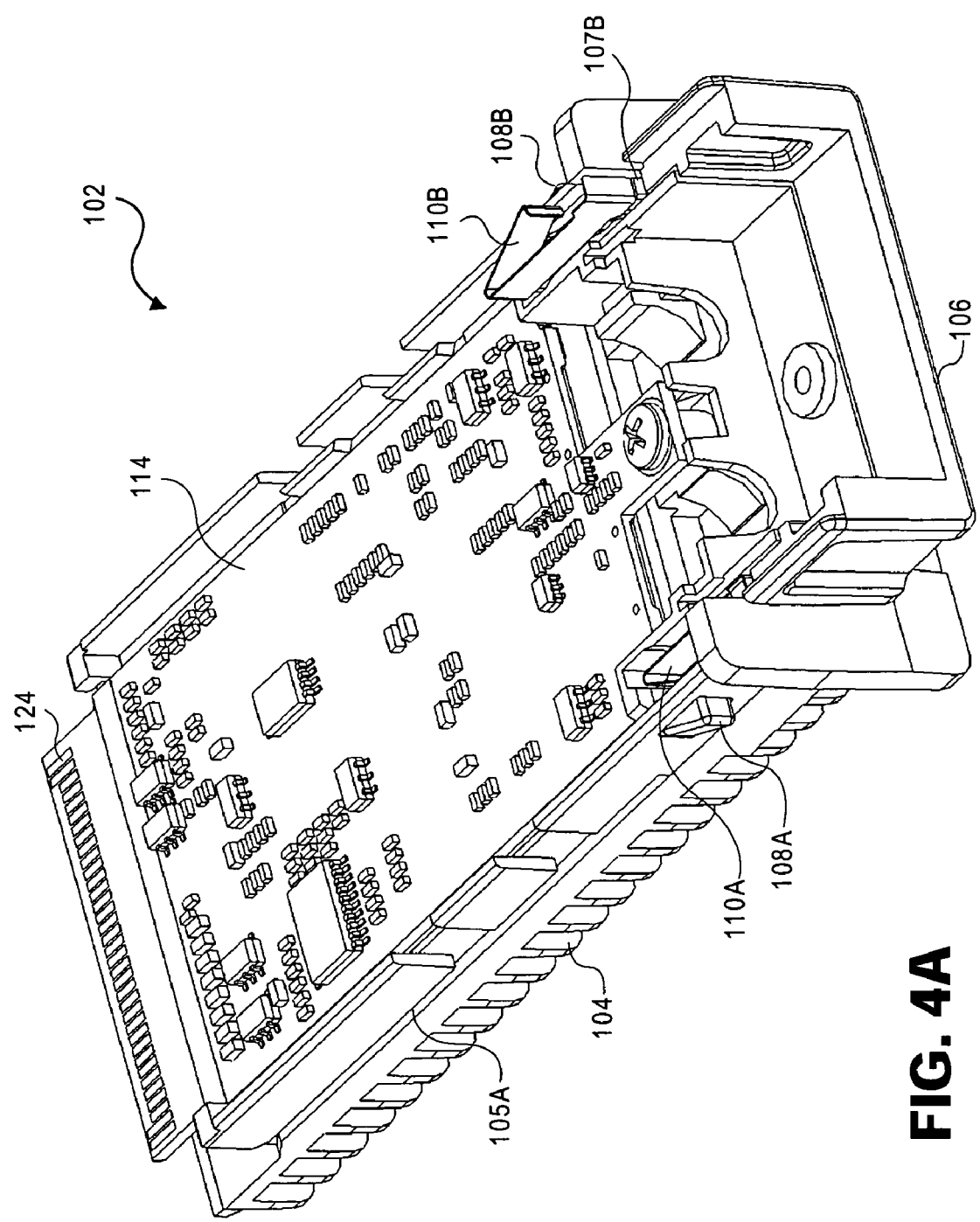
FIG. 4A is a perspective view of a latching mechanism in accordance with one embodiment of the present invention.
Figure 4B:
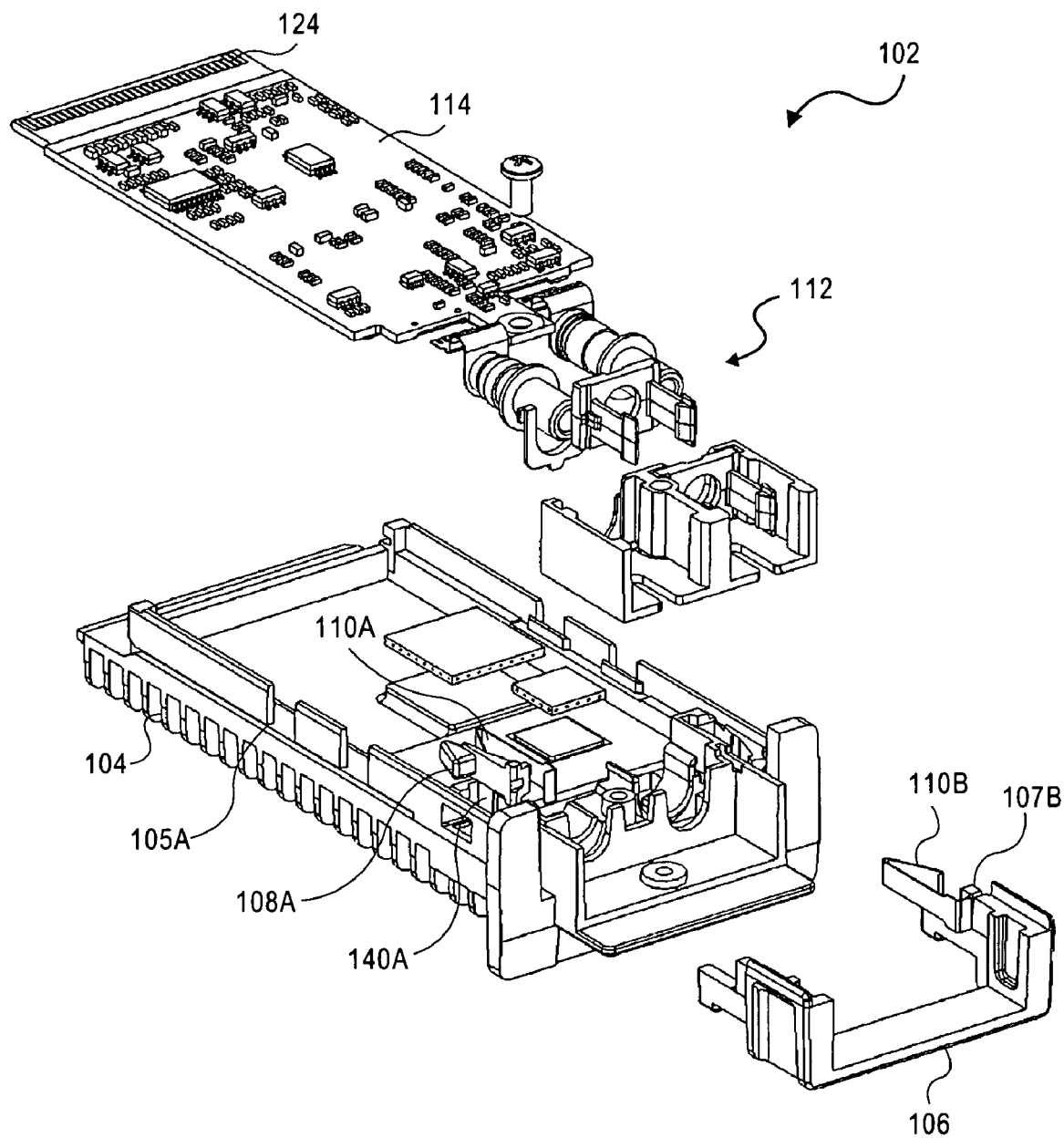
FIG. 4B is an exploded view of a latching mechanism in accordance with one embodiment of the present invention.

Turning to FIGS. 1-4B, an embodiment of a transceiver 102 having a latching mechanism 103 is shown. FIG. 1 shows a perspective top view of transceiver 102. FIG. 2A shows a perspective bottom view of transceiver 102. FIG. 2B shows an exploded bottom view of transceiver 102. FIG. 3 shows an exploded bottom view of transceiver 102. FIG. 4A shows a perspective view of transceiver 102. FIG. 4B shows an exploded bottom view of transceiver 102. It will be understood that point of reference terms, such as "top" and "bottom," are used herein for clarity to the reader and are not intended to limit the placement or mounting of transceiver 102 to any particular orientation. It is further noted that FIG. 2A shows a longitudinal centerline 190 of transceiver 102 that is used herein as a reference for describing embodiments of the present invention.

FIG. 1 shows the engagement of transceiver 102 to a host board 118 using a rail 120. In an embodiment compliant with the X2 MSA, the X2 MSA defines the configuration of rail 120. An X2 MSA compliant rail 120 is approximately 37 millimeters (mm) wide, 77 mm long, and 7 mm high.

Rail 120 allows unblocked airflow over the full length of the top surface of transceiver 102. Transceiver 102 may be mounted on the front panel, mid-board, or on a conventional Peripheral Component Interface (PCI) of a compact PCI blade. Rail 120 includes opposing engagements windows 122A and 122B. As discussed further below, latches 108A and 108B fit into engagement windows 122A and 122B, respectively, for securing transceiver 102 to rail 120. Tabs 130A and 130B of rail 120 fit into corresponding grooves 105A and 105B on opposing sides of heat sink 104 for aligning transceiver 102 with rail 120.

Transceiver 102 includes heat sink 104 coupled to an optics assembly 112 and a Printed Circuit Board (PCB) assembly 114. In one embodiment, heat sink 104 includes a single piece formed from metal. Heat sink is formed to hold optics assembly 112, PCB assembly 114 and latching mechanism 103.

In general, transceiver 102 converts between optical and electrical signals. Optics assembly 112 may be connected to optical fiber, or other optical waveguides, for sending and receiving optical signals. PCB assembly 114 connects to a socket 116 for sending and receiving electrical signals. PCB assembly 114 includes a board-edge connector 124 that fits into socket 116.

Referring to FIG. 2B, latching mechanism 103 includes a handle 106, opposing latches 108A and 108B, and opposing springs 110A and 110B. Latches 108A, 108B and springs 110A, 110B fit into cavities 140A and 140B of heat sink 104. Portions of handle 106 fit into recesses at the bottom of cavities 140A and 140B.

In one embodiment, latches 108A and 108B are each molded as a single plastic piece using injection molding. In another embodiment, handle 106 is molded using plastic injection molding. In yet another embodiment, springs 110A and 110B are formed from sheet metal.

Latches 108A, 108B and springs 110A, 110B are identical. Thus, there is not a "left" or "right" part, but the latches and springs are interchangeable. Such a design reduces manufacturing costs and makes assembly fast and easy since the latches and springs are manufactured to fit on either side of the latching mechanism 103. Symmetrical latches and springs also reduce occurrences of incorrect assembly. It will be understood that embodiments of the invention that are discussed in terms of the "A" side of latching mechanism 103, such as latch 108A, may include mirrored embodiments on the "B" side of latching mechanism 103, such as latch 108B.

Latch 108A includes a knife-edge pivot 109A. In one embodiment, the top and bottom of the knife-edge pivot 109A include a raised protrusion that fits into a well in cavity 140A (discussed further below). The raised protrusion is on the top and bottom of latch 108A. In one embodiment, latch 108A is a single piece of plastic that does not utilize a separate axle piece. Latch 108B includes a corresponding knife-edge pivot 109B.

Latch 108A also includes a latch end 111A that fits through engagement window 122A for retention of transceiver 102. Handle 106 includes a slot 107A and 107B for receiving one end of spring 110A and 110B, respectively. Latch 108A and spring 110A fit into cavity 140A of heat sink 104. Latch 108B and spring 110B into cavity 140B.

Referring to FIG. 3, when fully assembled, a PCB cover 150 fits over PCB assembly 114 and a portion of optics assembly 112. An optics assembly cover 152 fits over a portion of optics assembly 112. In one embodiment, latches 108A, 108B, and springs 110A, 110B, are captured in cavities 140A and 140B by PCB cover 150. Thus, the components of latching mechanism 103 are not attached to each other using glue or fasteners, but fit together within cavities 140A and 140B.

In one embodiment, latch mechanism 103 may use a drop-in assembly. Glue, screws, fasteners, or the like, are not used to connect components of latching mechanism 103. Latch 108A may be placed into cavity 140A. Spring 110A may then be positioned in cavity 140A with one end of spring 110A dropped into slot 107A. Thus, the latch 108A and spring 110A engage each for retention and retraction of transceiver 102, but latch 108A and spring 110A are not affixed to each other. Similarly, spring 110A is not affixed to handle 106, but rather engages handle 106 via slot 107A.

Embodiments of the latching mechanism described herein may use inexpensive parts. Further, these parts are easy and quick to assemble into latching mechanism 103. The lower assembly time equates to lower manufacturing costs. In one embodiment, it is estimated that manufacturing at high volume (e.g., 200,000 pieces) may cost about $1.40 per latching mechanism (that is, handle 106, springs 110A, 110B, and latches 108A, 108B).

Figure 5:
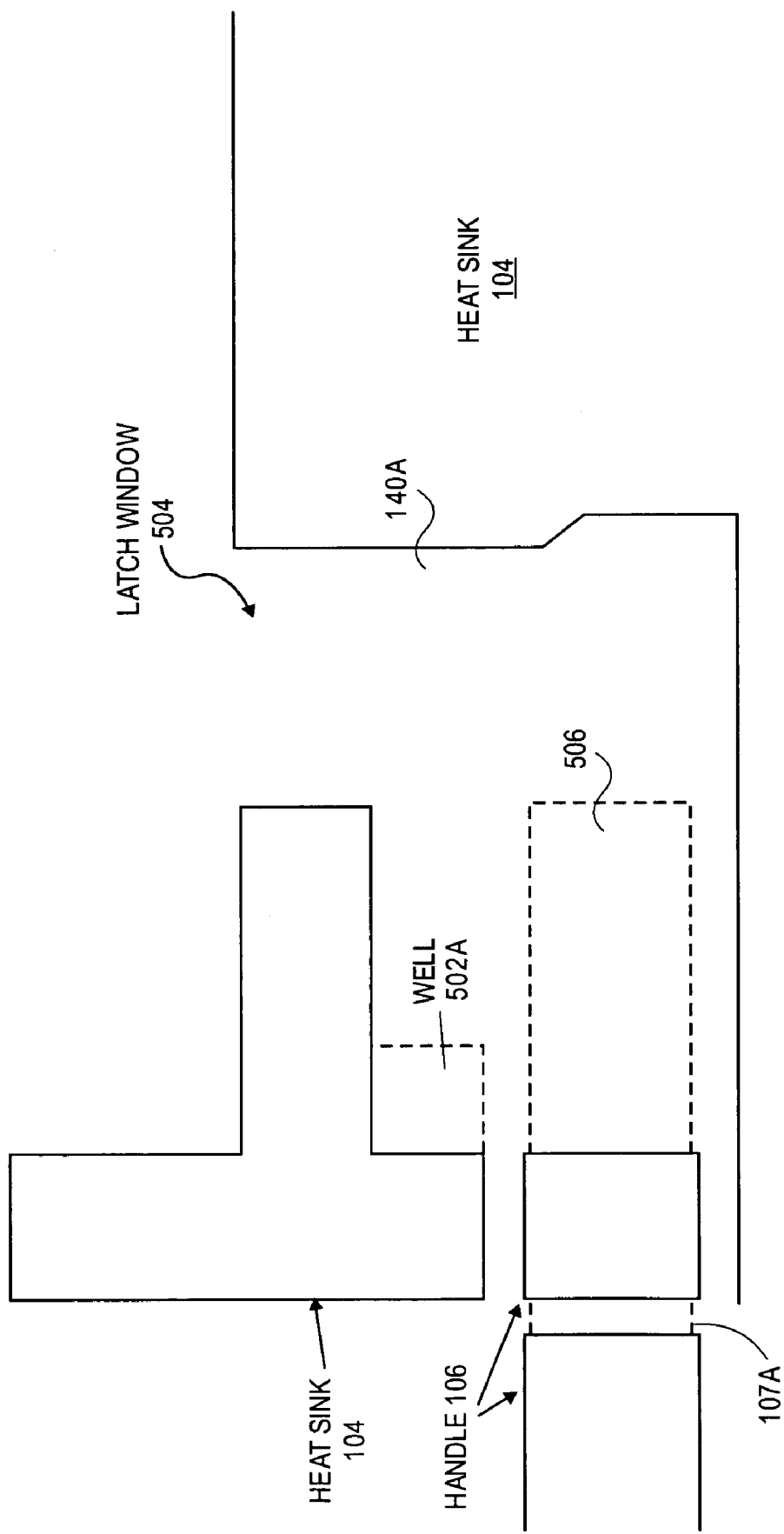
FIG. 5 is a block diagram of a latching mechanism in accordance with one embodiment of the present invention.
Figure 6A:
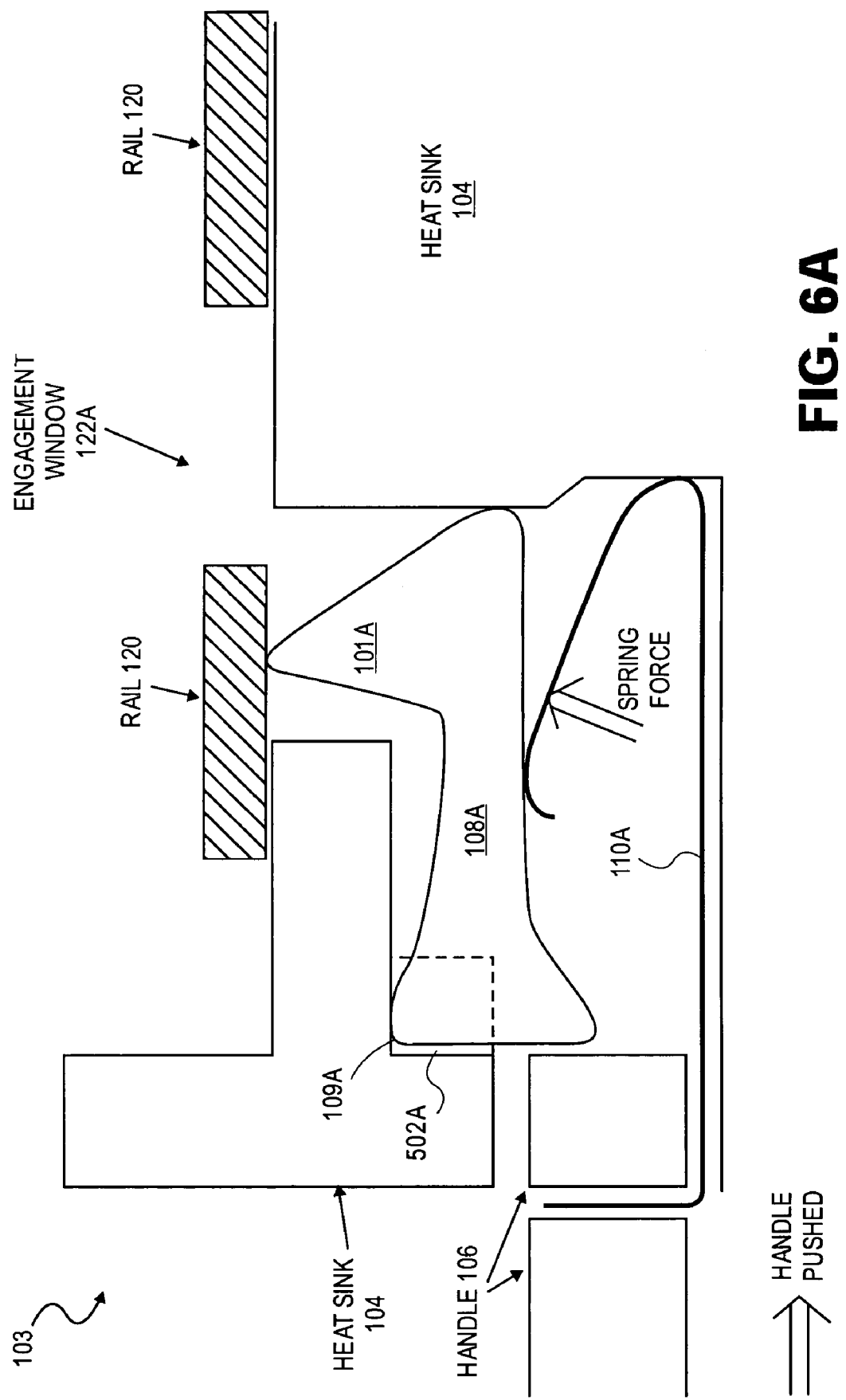
FIG. 6A is a block diagram of a latching mechanism in accordance with one embodiment of the present invention.
Figure 7B:
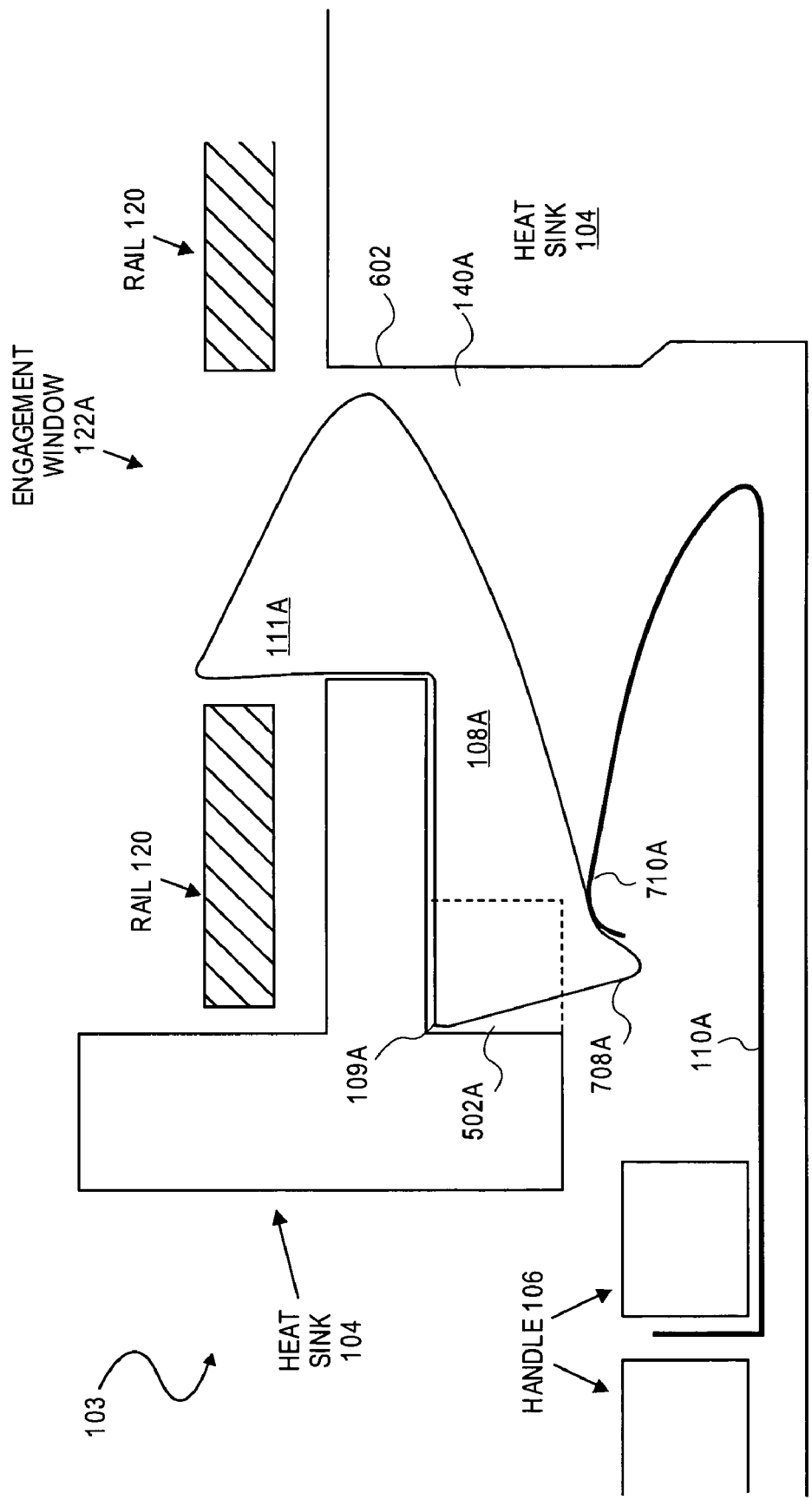
FIG. 7B is a block diagram of a latching mechanism in accordance with one embodiment of the present invention.
Figure 7C:
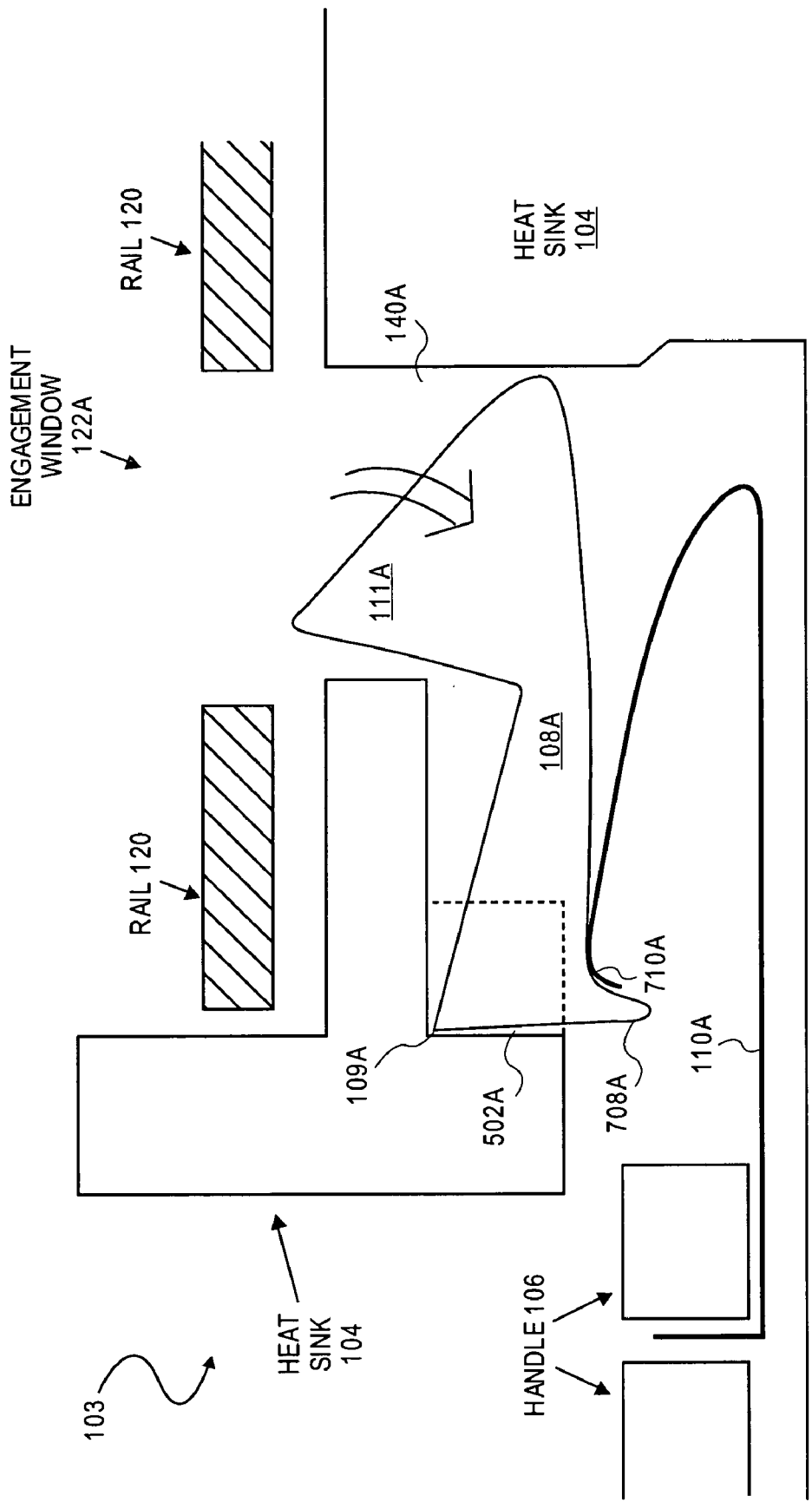
FIG. 7C is a block diagram of a latching mechanism in accordance with one embodiment of the present invention.

Turning to FIGS. 5, 6A, 6B, 6C, 7A, 7B and 7C, embodiments of the functioning of latching mechanism 103 will be discussed. FIG. 5 illustrates a bottom view of handle 106 and heat sink 104 without latch 108A and spring 110A. FIGS. 6A-6C illustrate an embodiment of pushing transceiver 102 into rail 120 for retention of transceiver 102. FIGS. 7A-7C show an embodiment of retraction of transceiver 102 from rail 120 using the latching mechanism 103. It will be understood that FIGS. 5, 6A-6C, and 7A-7C are not to scale or necessarily in proportion. While embodiments of latch 108A and spring 110A are discussed below, it will be understood that opposing latch 108B and spring 110B operate in a similar fashion.

Turning to FIG. 5, cavity 140A includes a well 502A for receiving latch 108A. In one embodiment, well 502A is an indentation molded into heat sink 104 that may receive a raised protrusion of knife-edge pivot 109A. Handle 106 includes slot 107A. A portion of handle 106, shown at 506 with a dotted line, is generally flush with the bottom of cavity 104. Latch 108A and spring 110A ride on top of handle portion 506.

FIG. 6A shows a bottom view of latching mechanism 103 as transceiver 102 is being pushed into rail 120. Grooves 105A and 105B of transceiver 102 have been lined up with corresponding tabs 130A and 130B of rail 120. Before latch end 111A of latch 108A reaches rail 120, latch end 111A protrudes out of heat sink 104 by spring force from spring 110A. For example, in FIG. 1, latch end 111A of latch 108A extends out of heat sink 104.

In FIG. 6A, a portion of rail 120 pushes against latch end 111A, forcing latch 108A into cavity 140A of heat sink 104. Latch 108A pivots about knife-edge pivot 109A when retracting into cavity 140A. Knife-edge pivot 109A turns within well 502A.

Turning to FIG. 6B, latching mechanism 103 is in a retention position. Latch end 111A extends from heat sink 104 into the engagement window 122A of rail 120. A spring force of spring 110A pushes against latch 108A to keep latch 108A in the retention position.

In one embodiment, latching mechanism 103 includes a self-locking geometry against a pull-out force placed on transceiver 102. In one embodiment, this self-locking geometry includes an angled wall 602. Angled wall 602 is a wall of heat sink 104 and also serves as a wall of cavity 140A opposite from handle 106.

Angled wall 602 angles away from handle 106 to widen latch window 504. FIG. 6C shows angle 606 formed between angled wall 602 and reference line 604, where reference line 604 is normal to longitudinal centerline 190 of transceiver 102. In one embodiment, angle 606 of angled wall 602 is approximately 2 degrees.

Angled wall 602 aids in the retention of transceiver 102. If transceiver 102 is moved without using the retraction mode of latching mechanism 103, then angled wall 602 guides latch 108A away from the transceiver longitudinal centerline 190 and into engagement window 122A. Latch 108A may more easily move into the engagement window 122A then swing against angled wall 602 to retract into cavity 140A.

In another embodiment of the self-locking geometry, latch 108A is slightly shorter in length than cavity 140A. Also, well 502A may be larger than the pivot protrusion of latch knife-edge pivot 109A. In this embodiment, latch 108A may shift slightly within cavity 140A. In the retention mode of latching mechanism 103, this "slight play" of latch 108A aides in the retention of transceiver 102. Referring to FIG. 6B, when transceiver 102 is pulled from rail 120 without use of handle 106, latch end 111A pushes against rail wall 608. The "slight play" of latch 108A may shift latch 108A within cavity 140A (and well 502A) so that latch 108A pushes against angled wall 602. Thus, friction between latch 108A and angled wall 602 helps prevent latch 108A from moving into cavity 140A. As discussed below, this friction between latch 108A and angled wall 602 is released during the retraction of transceiver 102 using latching mechanism 103.

Turning to FIGS. 7A-7C, the retraction of the transceiver 102 is shown. In FIG. 7A, handle 106 is being pulled to remove transceiver 102 from rail 120. As handle 106 is pulled, spring end 710A is dragged along latch 108A. In FIG. 7A, spring 110A starts at the retention position, shown by the dotted line. It is noted that latch end 111A stills extends from heat sink 104 while spring 110A is traveling along latch 108A.

Turning to FIG. 7B, spring end 710A has reached latch end 708A. It is noted that latch end 111A stills extends from heat sink 104 into engagement window 122A. Latch end 708A has a ramped end so that spring end 710A does not climb over latch end 708A.

Referring to FIG. 7C, handle 106 has been pulled slightly more to actuate the retraction of latch 108A. During the actuation, spring end 710A pushes against latch end 708A. Latch 108A pivots at the knife-edge pivot 109A and swings into cavity 140A. At this point, transceiver is no longer retained by rail 120 and may be completely pulled from rail 120.

In an embodiment of latching mechanism 103 having self-locking geometry, the "slight play" of latch 108A may also aid in the transition from retention to retraction as shown in FIGS. 7B and 7C. In FIG. 7B, latch 108A may shift slight to the left to move latch 108A away from angled wall 602 so the latch 108A is not touching angled wall 602. Thus, when latch 108A pivots to the retraction position, as illustrated in FIG. 7C, latch 108A may swing freely within cavity 140A without rubbing against angled wall 602.

It will be appreciated that spring 110A provides dual functionality. In the retention mode of latching mechanism 103, spring 110A provides a spring function to push latch 108A into the engagement window 122A. In the retraction mode, spring 110A acts as an actuator to translate the movement of handle 106 into the retraction of latch 108A into heat sink 104.

Embodiments of latching mechanism 103 provide a mechanism to retain an optical device in a corresponding rail without use of glue, fasteners, or the like. In one embodiment, latching mechanism 103 may be constructed using a drop-in assembly. In another embodiment, components of latching mechanism 103 may be symmetrical and thus, inexpensive to manufacture.

Figure 8:
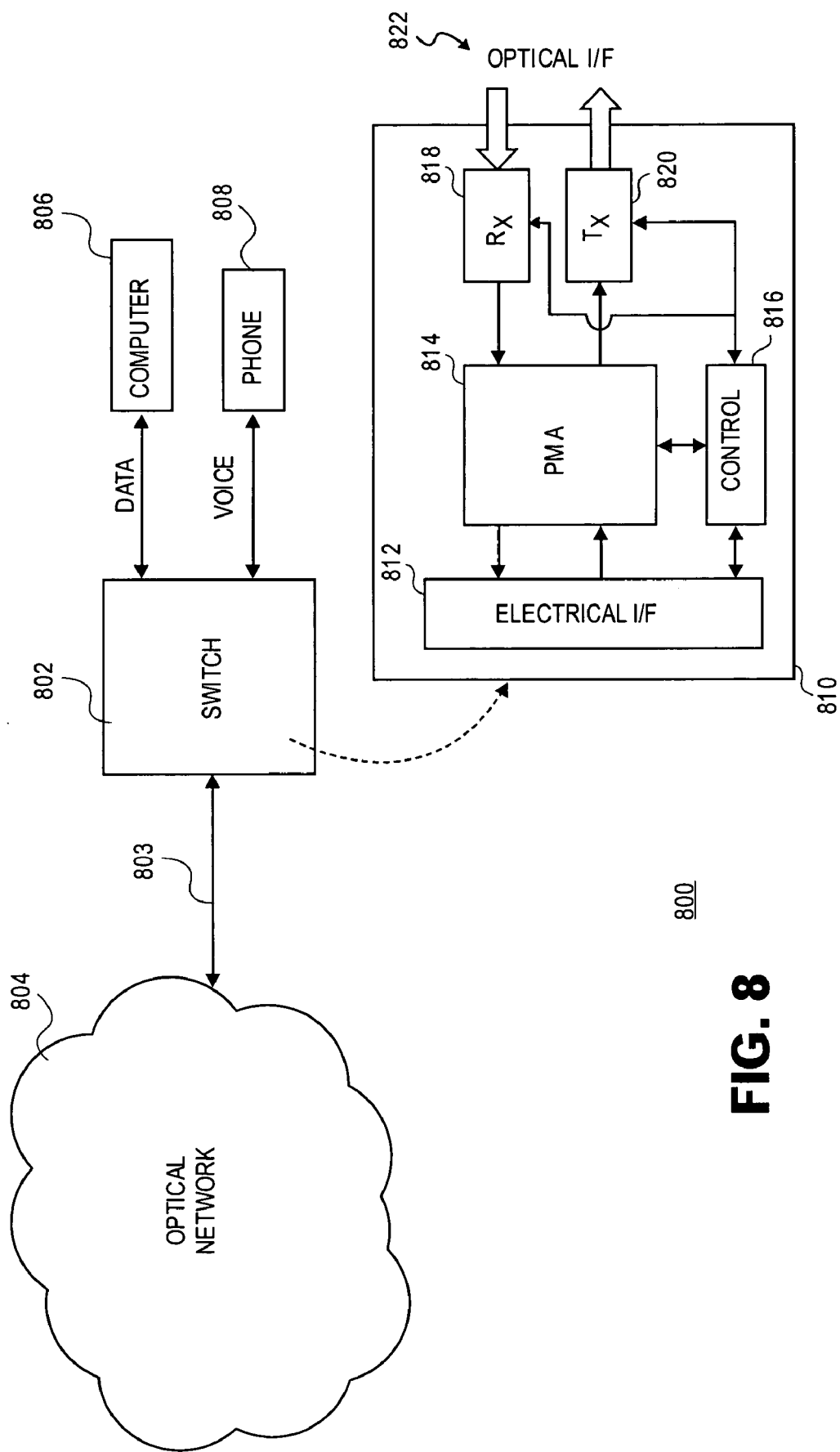
FIG. 8 is a block diagram of a system including a latching mechanism in accordance with one embodiment of the present invention.

Turning to FIG. 8, a system 800 utilizing a latching mechanism as described herein is illustrated. A switch 802 is connected to an optical network 804 by optical link 803. In one embodiment, optical link 803 includes one or more optical fibers. Switch 802 may be connected to one or more computer systems 806 and/or one or more phone devices 808. Switch 802 converts between optical signals of optical network 804 and electrical signals used by computer systems 806 and phone devices 808. Computer system 806 includes a router, a server, a host, or the like. In one embodiment system 800 includes a Dense Wavelength Division Multiplexed (DWDM) system.

Switch 802 may include one or more transceivers 810 having a latching mechanism as described herein. In one embodiment, transceiver 810 includes a transceiver compliant with the X2 MSA.

Transceiver 810 includes an optical interface 822 for sending and receiving optical signals to/from optical network 804 using optical link 803. Optical interface 822 is coupled to optical receiver 818 and optical transmitter 820. Optical receiver 818 and optical transmitter 820 are coupled to a Physical Medium Attachment (PMA) 814. PMA 814 includes a multiplexer/demultiplexer. The multiplexer may interleave multiple channels into a serialized data transmission to be sent by optical transmitter 820 while the demultiplexer separates a serialized data transmission received from optical receiver 818 into two or more channels.

PMA 814 is also coupled to electrical interface 812. Electrical interface 812 is used to electrically connect transceiver 810 to a host board of switch 802. In one embodiment, electrical interface 812 may include a board-edge connector.

A control system 816 is coupled to electrical interface 812, PMA 814, optical receiver 818, and optical transmitter 820. In one embodiment, control system 816 is implemented using a microcontroller. Control system 816 may make adjustments to components of transceiver 810 based on changes in environmental temperature or changes in the configuration of switch 802.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. An apparatus, comprising:
   a heat sink compatible with a rail, the heat sink including two engagement windows that align with a corresponding pair of rail engagement windows when the apparatus is positioned in the rail;
   a handle engaged with the heat sink, the handle to enable a retention position and a retraction position of the apparatus;
   a first latch and a second latch laterally opposed and positioned within a first cavity and a second cavity, respectively, of the heat sink; and
   a first spring and a second spring laterally opposed and positioned within the first and second cavities, respectively, of the heat sink, the first and second springs engaged with the handle and the first and second latches, wherein the first and second springs are to push a first latch end of each latch into the rail engagement window when the apparatus is in a retention position, wherein the first and second springs are to actuate the retraction of the first latch end of each latch when the handle is used to place the apparatus in a retraction position.

2. The apparatus of claim 1 wherein the first and second springs are to push the first latch end of the first and second latches away from a longitudinal centerline of the apparatus when the apparatus is in the retention position.

3. The apparatus of claim 1 wherein the first and second springs are to actuate rotating of the first and second latches toward a longitudinal centerline of the apparatus to the retraction position when the handle moves away from the apparatus.

4. The apparatus of claim 1 wherein the first and second latches include first and second knife-edge pivots, respectively.

5. The apparatus of claim 1 wherein the apparatus includes a self-locking geometry when in a retention position.

6. The apparatus of claim 5 wherein the self-locking geometry includes a first angled wall facing the first latch and a second angled wall facing the second latch.

7. The apparatus of claim 1 wherein the first and second latches, the first and second springs, and the handle are engaged using a drop-in assembly.

8. The apparatus of claim 1 wherein the apparatus includes an X2 transceiver module compliant with an X2 Multi-Source Agreement (MSA).

9. An optical device, comprising:
- a heat sink engaged with a latching mechanism, the latching mechanism including:
  - a handle engaged with the heat sink, the handle to enable a retention position and a retraction position of the optical device;
  - a first latch and a second latch laterally opposed and positioned within a first cavity and a second cavity, respectively, of the heat sink; and
  - a first spring and a second spring laterally opposed and positioned within the first and second cavities, respectively, of the heat sink, wherein the first and second latches, the first and second springs, and the handle are engaged using a drop-in assembly.

10. The optical device of claim 9 wherein the first and second springs are to push the first and second latches, respectively, away from a longitudinal centerline of the optical device when the optical device is in a retention position.

11. The optical device of claim 9 wherein the first and second springs are to actuate the retraction of the first and second latches toward a longitudinal centerline of the optical device when the optical device is put in retraction position.

12. The optical device of claim 9 wherein the first and second latches include first and second knife-edge pivots, respectively, the first knife-edge pivot to turn within a first well of the first cavity and the second knife-edge pivot to turn within a second well of the second cavity.

13. The optical device of claim 9 wherein the optical device includes a self-locking geometry when in the retention position.

14. The optical device claim 13 wherein the self-locking geometry includes a first angled wall of the first cavity facing the first latch and a second angled wall of the second cavity facing the second latch.

15. The optical device of claim 14 wherein the first and second latches are shorter than the first and second cavities, respectively, to allow the first and second latches to shift parallel to a longitudinal centerline of the optical device when the handle is moved between the retention position and the retraction position.

16. The optical device of claim 9 wherein the optical device includes an X2 transceiver device compliant with an X2 Multi-Source Agreement (MSA).

17. A system, comprising:
- an optical fiber;
- a transceiver module positioned in a rail and coupled to the optical fiber, the transceiver module comprising:
  - a heat sink including two engagement windows that align with a corresponding pair of rail engagement windows;
  - a handle engaged with the heat sink, the handle to enable a retention position and a retraction position of the transceiver module;
  - a first latch and a second latch laterally opposed and positioned within a first and a second cavity, respectively, of the heat sink; and
  - a first spring and a second spring laterally opposed and positioned within the first and second cavities, respectively, of the heat sink, the first and second springs engaged with the handle and the first and second latches, wherein the first and second springs are to push a first latch end of each latch into the rail engagement window when the transceiver module is in a retention position, wherein the first and second springs to actuate the retraction of the first latch end of each latch when the handle is used to place the transceiver module in a retraction position.

18. The system of claim 17 wherein the first and second latches, the first and second springs, and the handle are engaged using a drop-in assembly.

19. The system of claim 17 wherein the system includes a switch, the rail coupled to a host board of the switch.

20. The system of claim 17 wherein the transceiver module includes an X2 transceiver module compliant with an X2 Multi-Source Agreement (MSA).

* * * * *